United States Patent [19]

Thesenfitz

[11] 4,400,155
[45] Aug. 23, 1983

[54] EQUIPMENT FOR HEATING PULVERULENT PRODUCTS

[75] Inventor: Klaus Thesenfitz, Winsen/Luhe, Fed. Rep. of Germany

[73] Assignee: Linhoff & Thesenfitz Maschinenbau GmbH, Winsen/Luhe, Fed. Rep. of Germany

[21] Appl. No.: 317,026

[22] Filed: Nov. 2, 1981

[30] Foreign Application Priority Data

Dec. 30, 1980 [DE] Fed. Rep. of Germany ....... 3049520
Jan. 16, 1981 [DE] Fed. Rep. of Germany ....... 3101308

[51] Int. Cl.³ .................... F27B 14/00; F26B 9/18; F27B 9/08
[52] U.S. Cl. .................................. 432/151; 432/139; 432/153; 432/247
[58] Field of Search ................ 432/139, 151, 153, 247

[56] References Cited

U.S. PATENT DOCUMENTS

| 850,041 | 4/1907 | McNeal | 432/151 |
| 1,075,592 | 10/1913 | Morrell | 432/151 |
| 1,167,763 | 1/1916 | Krickbaum | 432/153 |
| 1,825,947 | 10/1931 | Fowler et al. | 432/139 |
| 4,136,536 | 1/1979 | Gorodissky et al. | 34/242 |
| 4,188,186 | 2/1980 | Ladwig | 432/151 |
| 4,238,238 | 12/1980 | Kinkade et al. | 432/151 |
| 4,332,552 | 6/1982 | Seelandt | 432/247 |

Primary Examiner—John J. Camby
Attorney, Agent, or Firm—Alan H. Levine

[57] ABSTRACT

Equipment for heating pulverulent products, including a relatively flat, vertically standing vessel for receiving the product, and a rotatable agitator whose axis of rotation is coincident with the longitudinal axis of the vessel. There are heating facilities in the bottom of the vessel. With these heating facilities, the bottom and side wall of the vessel are heated. The top of the vessel is insulated. The product is introduced into the vessel through the top and discharged in the region of the bottom of the vessel.

3 Claims, 1 Drawing Figure

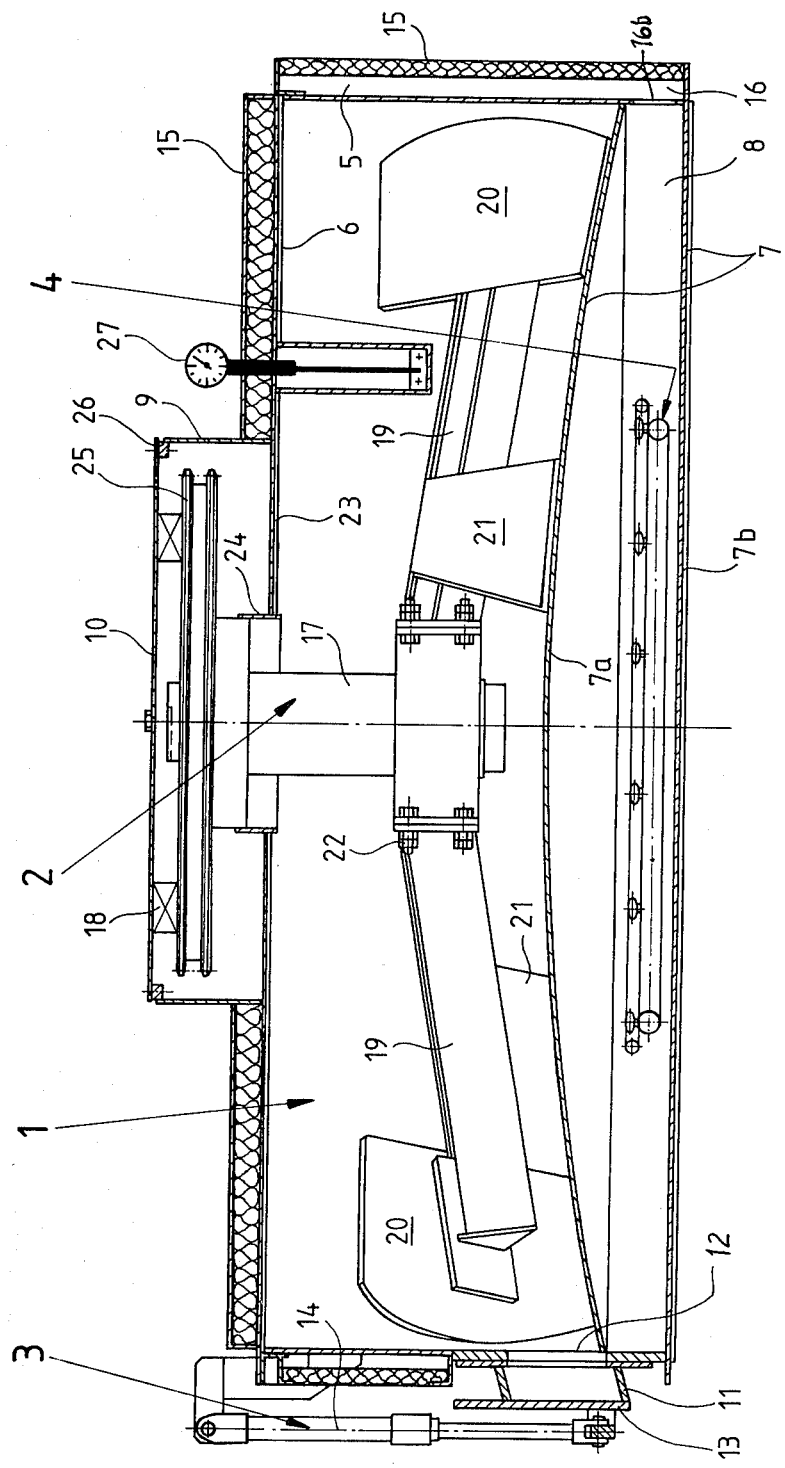

EQUIPMENT FOR HEATING PULVERULENT PRODUCTS

The invention relates to equipment for heating pulverulent products. A preferred application of the inventive equipment is the heating of pulverulent mineral powder to a temperature of about 180° C.

The inventive equipment is based on equipment which has as basic components, a cylindrical vessel with a vertical longitudinal axis, an agitator, and heating facilities for the vessel. In regard to the construction of the vessel and of the agitator, the invention is based on equipment described in the German Offenlegungsschrift No. 2,649,815. This known equipment is designed for an essentially different purpose, with essentially different criteria, from that of the present invention, in that the known equipment relates to the cooking of plastic materials, especially melted asphalt, while the present invention is concerned with the heating of pulverulent materials, such as mineral powder.

It is an object of the invention to provide equipment, comprising vessel, agitator, and heating facilities, whereby the product to be heated in the vessel is brought to the desired end temperature in the shortest possible time, the product being brought to a uniform final temperature as gently as possible.

In order to accomplish this objective, the inventive equipment has the following characteristics:

1. The vessel is a flat drum with a bottom and a dome-like housing for supporting the agitator, which is mounted in the top of the vessel;
2. The agitator, which is symmetrical about the longitudinal axis of the vessel, has a vertical shaft which, at its lower end, has radial arms carrying stirrer blades which slide over the bottom of the vessel and, at its upper end, is supported by parts of the drive in the dome-like housing;
3. The heating facilities in the form of a ring burner are in a chamber between horizontal parts of the bottom of the vessel, of which the upper part is heat conducting and separates the chamber from the interior of the vessel, while the lower part is heat insulating and closes off the chamber at the bottom; and
4. The side wall of the vessel is of double-wall construction and, between the heat-conducting inner wall and the heat-insulated outer wall forms an annular channel, the lower end of which is connected with the heating chamber and the upper end of which is open.

That part of the bottom of the vessel which faces the interior of the vessel should preferably be curved towards the inside. The diameter/height ratio of the vessel should preferably fall within the range of about 2:1 to 3:1. Further advantageous inventive characteristics are evident from the following description referring to the accompanying drawing.

According to the invention, the material is brought to the desired final temperature while being stirred constantly. As a result, on the one hand, the material is heated very uniformly and, on the other hand, the material is treated very carefully, i.e., overheating of some parts and inadequate heating of other parts is avoided, and consequently the final temperature can be reached in a relatively short time. The design of the agitator as a taper-bore mounted shaft with stirrer arms at the lower end enables the rotating characteristics to be optimized for the material and offers the possibility of assembling and dismantling the agitator in a simple manner. In this way, the care and maintenance of the equipment is facilitied and therefore the equipment can be cared for and maintained on a regular basis, which ensures optimal operating conditions.

The dimensions of the vessel of the invention, its very extensive insulation, and the inventive arrangement and design of the heating facilities create a compact assembly, in which the heat is maintained, which is to the benefit of heating the product and of the energy balance.

An example of the operation of the invention is shown in the drawing and explained in the following description.

The main components of the inventive equipment are the vessel 1, the agitator 2, the emptying device 3, and the heating facilities 4. The vessel consists of a cylindrical, vertical side wall 5 of heat-conducting material, a lid 6, and a bottom 7. The bottom is of double-wall construction, including an interior bottom 7a, curved towards the interior of the vessel, and a flat exterior, insulated bottom 7b. The interior and exterior bottom walls form between them, and the lower part of the side wall 5, a chamber 8 for holding the heating facilities 4. An outwardly protruding housing 9, which is closed off by a detachable lid 10, is mounted centrally on the lid 6 of the vessel. In the lower region of the side wall 5 of the vessel, the opening 12, which communicates with an approximately horizontal section of pipe 11, is used for emptying the vessel. The opening 12 can be closed off and released with a sliding panel, which acts together with the outer end of the section of pipe 11 and can be shifted with a hydraulic cylinder 14. The closure can also be designed differently, even as an automatic closure. The lid 6 and side wall 5 of the vessel are covered with heat insulation panels 15. Between the heat-conducting side wall 5 and the insulation panels covering it, an annular channel 16 is formed which is connected at the bottom, through outlet opening 16b, with the combustion chamber 8 and is open at the top, so that the heat energy, produced by the heating facilities 4, heats not only the bottom part 7a but also the side wall 5.

The heating facilities 4 in chamber 8 are a ring-shaped burner of a convenient construction, for example a gas burner which is supplied with gas and air through pipes which pass through the annular space 16.

The material to be treated should be introduced into the vessel from above, for example, through a feed hopper passing through the top 6.

The diameter of the vessel should be about twice to three times as large as its height in order to offer as large a heated area as possible to the product.

The agitator 2 has a vertical shaft 17, which is suspended so that it can rotate in a collar 18 in the top 10 of the housing 9. At its lower end, the shaft has two radial arms 19, which are mutually offset by 180°. Each of these arms has a mixing plate 20 at its outer end near the side wall 5 of the vessel, and a bottom scraper 21 in different regions between the mixing plate 20 and the shaft 16, so that the two bottom scrapers together pass over most of the bottom part 7a. So that they can be detached, the arms 19 are connected with bolted connections 22 to the shaft 16. In the region of the top 6 of the vessel, the interior of the housing 9 and the interior of the vessel 1 are separated from each other by a horizontal dividing wall 23. By means of a bearing 24 in the dividing wall 23, the shaft 16 is passed through the dividing wall so that it can rotate while the material to be treated cannot get into the housing 9. The part of the agitator drive assigned to the shaft 16 is mounted in the housing directly below the upper end of the shaft 16. In the illustrative example, the drive is shown as including an externally driven sprocket wheel 25. The top 10 is set on the housing 9 with a flange 26, which at the same time has the function of a seal.

The temperature, and optionally the pressure, in the interior of the vessel 1 can be recorded with an indicator 27. The particular size of the pulverulent material has no significant importance. The pulverulent material can be in the form of a flour or of a granulate.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. Apparatus for heating pulverulent products, comprising:
   a cylindrical vessel having the shape of a flat drum with a diameter to height ratio of about 2:1, the vessel having a double-walled side wall, the two walls of which define an annular space between them, the outer wall being heat insulated and the inner wall being heat conducting,
   a double walled bottom for the vessel, the two walls of which are spaced apart vertically, the lower bottom wall being heat insulated and the upper bottom wall being upwardly curved and heat conducting,
   the vessel having an upper filling opening and a lower discharge opening for the product to be treated,
   a dome-like housing mounted on top of the vessel,
   a dividing wall separating the interior of the vessel from the interior of the dome-like housing,
   an agitator which is symmetrical about the longitudinal axis of the vessel, the agitator including a vertical shaft passing through and being rotatably supported by the dividing wall,
   two radial arms projecting from the lower end of the agitator shaft and arranged 180° apart, each arm carrying a stirrer blade near the cylindrical side wall of the vessel and a bottom scraper, one of the bottom scrapers being adjacent to the stirrer blade carried by its arm and the other bottom scraper being adjacent to the shaft, each bottom scraper having a dimension along its respective arm equal to about one half the distance between the shaft and each stirrer blade,
   means for rotating the agitator shaft located within the dome-like housing,
   a removable lid on the dome-like housing, means carried by the lid for supporting the agitator shaft, and a gasket between the lid and the housing for providing a seal,
   the space between the two bottom walls defining a heating chamber, heating means in the form of a ring burner within the heating chamber, the burner being supplied with fuel through pipes located within the spaces between the two side walls of the vessel, the heating chamber communicating with the lower end of the annular space between the two side walls and that space being open at its upper end.

2. Equipment according to claim 1, characterized by the fact that the lid of the vessel is provided with insulation panels which are mounted on the lid.

3. Equipment according to claim 1, characterized by the fact that the discharge opening is in the lower region of the side wall of the vessel and can be closed off by means of a hydraulically moveable sliding panel.

* * * * *